(12) United States Patent
Chou

(10) Patent No.: US 8,542,452 B2
(45) Date of Patent: Sep. 24, 2013

(54) VOICE COIL MOTOR AND LENS MODULE

(75) Inventor: Tai-Hsu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/405,374

(22) Filed: Feb. 27, 2012

(65) Prior Publication Data

US 2013/0107382 A1    May 2, 2013

(30) Foreign Application Priority Data

Nov. 1, 2011 (TW) .............................. 100139680 A

(51) Int. Cl.
*G02B 7/02* (2006.01)

(52) U.S. Cl.
USPC .......................................................... 359/824

(58) Field of Classification Search
USPC .......................................................... 359/824
See application file for complete search history.

(56) References Cited

U.S. PATENT DOCUMENTS

| | | | | |
|---|---|---|---|---|
| 2010/0033616 A1* | 2/2010 | Huang et al. | .................. | 348/335 |
| 2012/0008221 A1* | 1/2012 | Min et al. | ...................... | 359/824 |

* cited by examiner

*Primary Examiner* — James Jones
(74) *Attorney, Agent, or Firm* — Altis Law Group, Inc.

(57) ABSTRACT

A voice coil motor (VCM) includes a case, a lens holder, a spring sheet, a coil, a magnet assembly, and a guiding ring. The case includes an inner surface. The lens holder is received in the case. The spring sheet is connected between the case and the lens holder. The coil circles around the lens holder. The magnet assembly is positioned on the inner surface of the case. The guiding ring defines a guiding hole and is positioned on the inner surface of the case, and one end of the lens holder is received in the guiding hole.

12 Claims, 4 Drawing Sheets

VOICE COIL MOTOR AND LENS MODULE

BACKGROUND

1. Technical Field

The present disclosure relates to voice coil motors (VCMs) and, particularly, to a VCM with a guiding ring and a lens module using the VCM.

2. Description of Related Art

VCMs are used in lens modules for driving lens holders of the lens modules to move relative to cases of the lens modules. A VCM typically includes at least a spring sheet connected between the case and the lens holder. However, if the lens holder inclines on a plane perpendicular to an optical axis during focusing, the image quality of the images captured by the lens module will be decreased.

Therefore, it is desirable to provide a VCM that can overcome the limitations described.

DETAILED DESCRIPTION

Embodiments of the disclosure will now be described in detail, with reference to the accompanying drawings.

Figure 1:
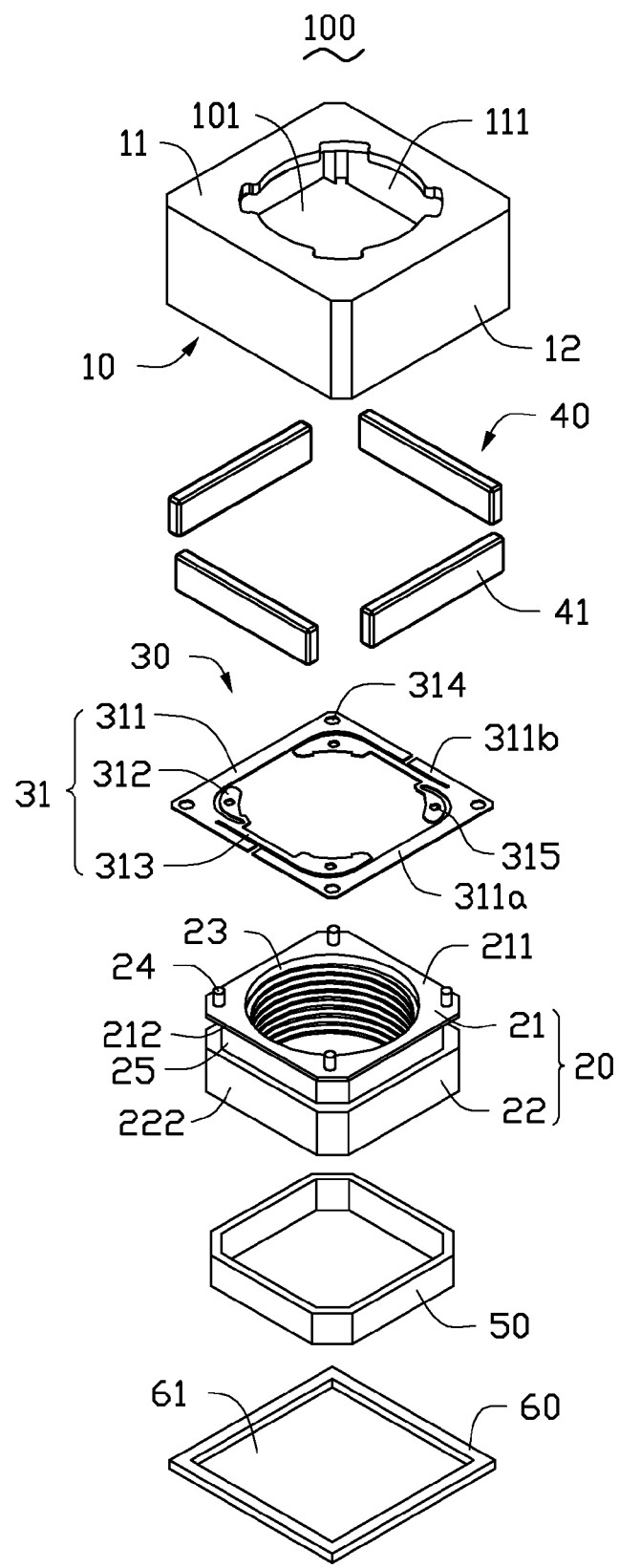
FIG. 1 is an isometric, exploded, and schematic view of a VCM in accordance with an exemplary embodiment.
Figure 2:
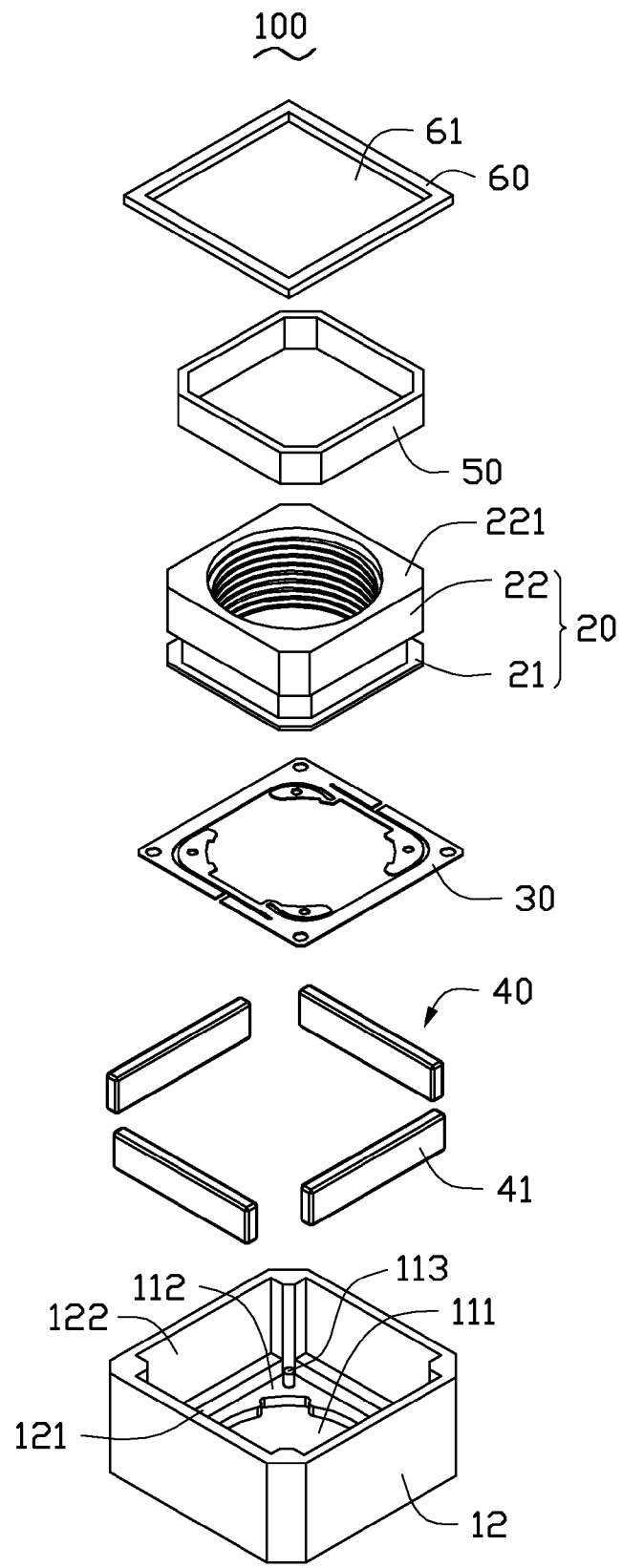
FIG. 2 is similar to FIG. 1, but viewed from another angle.

Referring to FIGS. 1-2, a voice coil motor (VCM) 100, according to an exemplary embodiment, includes a case 10, a lens holder 20, a spring sheet 30, a magnet assembly 40, a coil 50, and a guiding ring 60.

The case 10 has a cubic configuration, and includes an upper plate 11 and four sidewalls 12 substantially perpendicularly extending downward from four peripheral edges of the upper plate 11. The upper plate 11 and the sidewalls 12 cooperatively define a receiving room 101 for receiving the lens holder 20, the spring sheet 30, the magnet assembly 40, the coil 50, and the guiding ring 60. The upper plate 11 defines a first through hole 111, substantially at a central portion of the upper plate 11. The upper plate 11 includes a bottom surface 112. A number of first positioning poles 113 extend downward from the bottom surface 112, substantially at corners of the bottom surface 112. Each of the sidewalls 12 includes an inner surface 121, and defines a first receiving recess 122 on the inner surface 121. In the embodiment, there are four the first positioning poles 113.

The lens holder 20 has a cubic configuration, and includes a first portion 21 and a second portion 22 connected at one end of the first portion 21. The first portion 21 includes an upper surface 211 facing away the second portion 22. The second portion 22 includes a lower surface 221 facing away the first portion 21. A screw hole 23 is defined in the lens holder 20 and extends through the upper surface 211 and the lower surface 221, substantially at the center of the lens holder 20. A number of second positioning poles 24 extend upward from the upper surface 211, substantially at corners of the upper surface 211. The first portion 21 includes a first outer surface 212, and the second portion 22 includes a second outer surface 222. The first portion 21 defines a second receiving recess 25 in the first outer surface 212. The second receiving recess 25 surrounds the first portion 21. In the embodiment, there are four second positioning poles 24.

The spring sheet 30 can be formed by punching and are made of steel. The spring sheet 30 is square-shaped and includes two spring portions 31 with the same structure. Each of the spring portions 31 includes an outer portion 311, two inner portions 312, and a connection portion 313 connected between the outer portion 311 and the inner portion 312. The outer portion 311 is substantially U-shaped and includes a first section 311a and two second sections 311b substantially perpendicularly positioned at two ends of the first section 311a. One end of the connection portion 313 is connected to a corner of the outer portion 311 and another end extends out of the outer portion 311 along the second sections 311b. One of the inner portions 312 is connected to an end of the connection portion 313, and is positioned at a corner of the outer portion 311. The other inner portion 312 is connected to another end of the connection portion 313, and is positioned at a corner of another spring portion 31. Each of the outer portions 311 defines a number of first fixing holes 314, substantially at corners of the outer portion 311. Each of the inner portions 312 defines a second fixing hole 315. In the embodiment, two first fixing holes 314 are respectively positioned at two corners of each outer portion 311.

The magnet assembly 40 includes four magnets 41, each of the magnets 41 is plate shaped. The four magnets 41 are respectively received in the first receiving recesses 122. In alternative embodiments, the magnet assembly 40 can be an annular magnet which can be positioned on the inner surface 121 of the sidewalls 12. In further alternative embodiments, in order to save the cost of the VCM 100, the magnet assembly 40 is consisted of two magnets 41 and the other two can be omitted. The two magnets 41 are respectively received in the first receiving recesses 122 of two opposite sidewalls 12.

The coil 50 is encircled around the first portion 21 of the lens holder 20, and received in the second receiving recess 25. One end of the coil 50 is connected to one of the spring portions 31, and another end of the coil 50 is connected to another spring portion 31. Therefore, the current can flow to the coil 50 through the spring sheet 30.

In other embodiments, the coil 50 can be positioned on the inner surfaces 121 of the sidewalls 12, and the magnet assembly 40 can be received in the second recessing recess 25 of the first portion 21.

The guiding ring 60 is plate-shaped and made from non-magnetic materials. The guiding ring 60 defines a guiding hole 61, substantially at a central portion of the guiding ring 60. A cross-sectional area of the guiding hole 61 is slightly greater than that of the second portion 22 of the lens holder 20.

Figure 3:
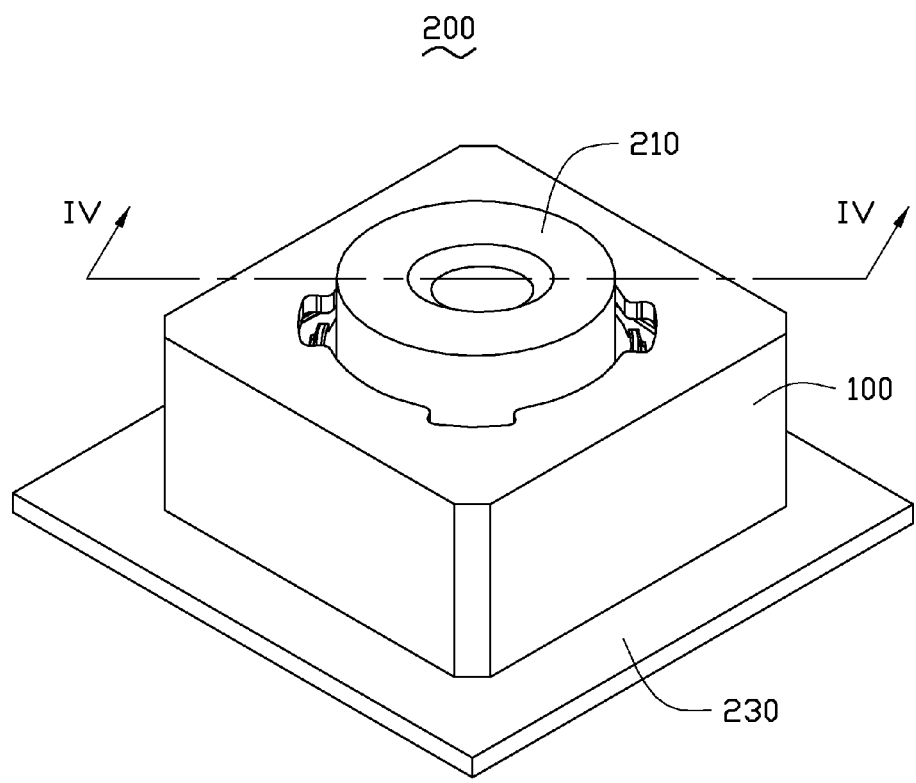
FIG. 3 is an assembled view of a lens module using the VCM of FIG. 1.
Figure 4:
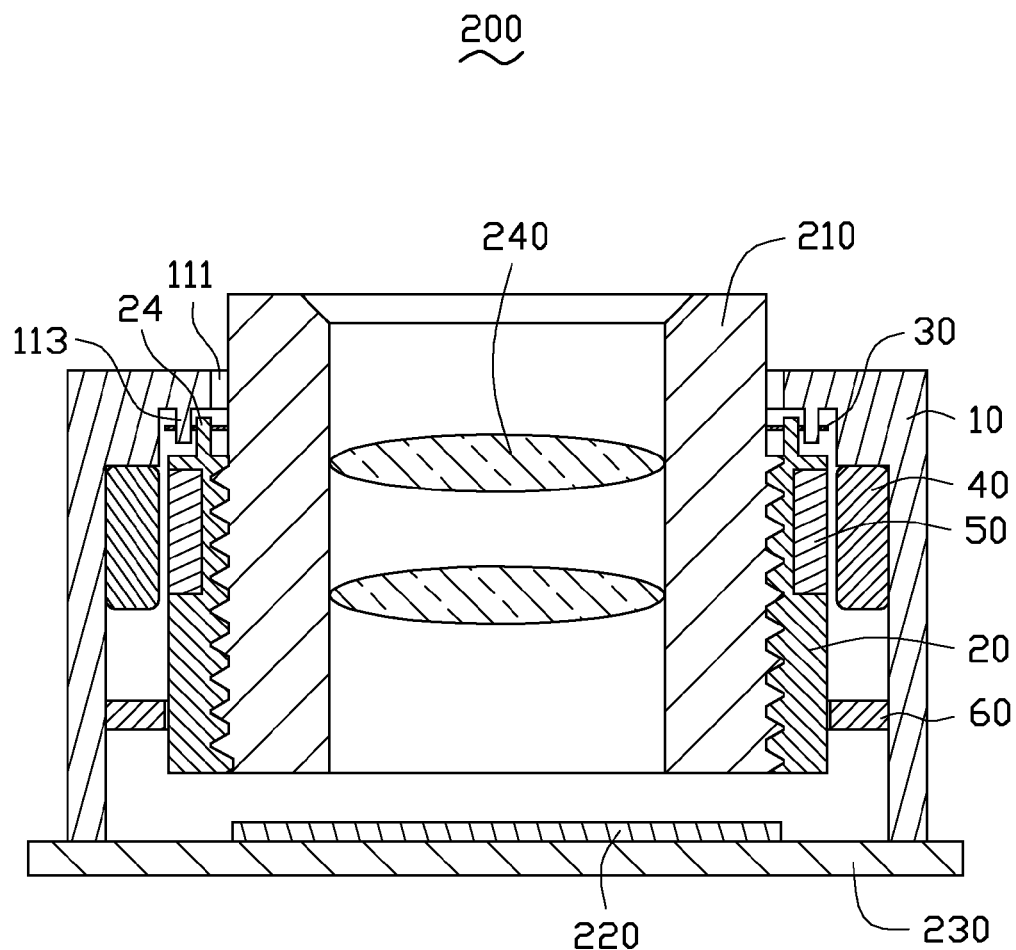
FIG. 4 is a cross-sectional view taken along a line IV-IV of FIG. 3.

Referring to FIGS. 3-4, in assembly, first, the magnet assembly 40 is attached on the inner surfaces 121 of the sidewalls 12, and the coil 50 is circled around the first portion 21 of the lens holder 20 and accommodated in the second receiving recess 25. Secondly, the lens holder 20 is received in the receiving room 101 of the case 10, and the spring sheet 30 is interconnected with the upper plate 11 of the case 10 and the lens holder 20. The first fixing holes 314 are sleeved on the first positioning poles 113, and the second fixing holes 315 are sleeved on the second positioning poles 24. The first positioning poles 113 and the second positioning poles 24 are firmly connected to the spring sheet 30 with glue. Thirdly, the guiding ring 60 is attached on the inner surface 121 of the sidewalls 12, spaced apart from the upper plate 11. An outer edge of the guiding ring 60 is wholly physically touches the inner surfaces 121. The second portion 22 of the lens holder 20 is received in the guiding hole 61 of the guiding ring 60. The lens holder 20 and the guiding hole 61 are coaxial with each other.

During the focusing process, the coil 50 circling the lens holder 20 is supplied with current via the two spring portions 31. The coil 50 generates a magnet field according to a principle of electromagnetic induction. The lens holder 20 is driven to move along the optical axis by a magnetic force between the coil 50 and the magnet assembly 40 from an initial position. The spring sheet 30 generates a recoverable deformation during the moving of the lens holder 20. When the current supplied to the coil 50 is switched off, the lens holder 20 is draw back to the initial position. During the moving of the lens holder 20, the second portion 22 keeps receiving in the guiding hole 61. When a force parallel with a plane perpendicular to the optical axis is applied on the lens holder 20, an inclined angle of the lens holder 20 is limited in a receivable range by the guiding ring 60. Furthermore, as the guiding ring 60 is interconnected the case 10 and the lens holder 20, a magnetic field generated by magnet assembly 40 and the coil 50 is shielded by the guiding ring 60. Electrical signals generated by an image sensor 220 positioned under the lens holder 20 will not be interfered by the magnetic field.

Referring to FIG. 3-4, a lens module 200, according to an exemplary embodiment, includes the VCM 100, a lens barrel 210, the image sensor 220, a support plate 230, and lenses 240. The lenses 240 are received in the lens barrel 210. The lens barrel 210 is screwed in the screw hole 23 of the lens holder 20. The image sensor 220 is supported on the support plate 230. The support plate 230 is positioned at one end of the case 10 facing away the upper plate 11. The image sensor 220 faces the lens barrel 210 and is optically aligned with the lenses 240, and the image sensor 220 and the lens barrel 210 are coaxial with each other.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor (VCM), comprising:
   a case comprising an inner surface; the case comprising an upper plate and four sidewalls perpendicularly extending downward from four peripheral edges of the upper plate; the upper plate comprising a bottom surface and a plurality of first positioning poles extending downward from the bottom surface;
   a lens holder received in the case; the lens holder comprising an upper surface facing the bottom surface and a plurality of second positioning poles extending upward from the upper surface;
   a spring sheet connected between the first positioning poles and the second positioning poles;
   a coil;
   a magnet assembly, wherein one of the coil and the magnet assembly is positioned on and circles around the lens holder, the other of the coil and the magnet assembly is positioned on the inner surface of the case; and
   a guiding ring defining a guiding hole and being positioned on the inner surface of the case, one end of the lens holder being received in the guiding hole.

2. The VCM of claim 1, wherein the lens holder comprises a first portion and a second portion connected at one end of the first portion, the first portion is adjacent to the upper plate, and the second portion is received in the guiding hole.

3. The VCM of claim 2, wherein the first portion comprises an outer surface, and defines a second receiving recess in the outer surface, the coil is received in the second receiving recess.

4. The VCM of claim 3, wherein a cross-sectional area of the guiding hole is slightly greater than that of the second portion of the lens holder.

5. The VCM of claim 1, wherein one end of the coil is connected to one of the spring portions, and another end of the coil is connected to the other spring portion.

6. A lens module, comprising:
   a case comprising an inner surface; the case comprising an upper plate and four sidewalls perpendicularly extending downward from four peripheral edges of the upper plate; the upper plate comprising a bottom surface and a plurality of first positioning poles extending downward from the bottom surface;
   a lens holder received in the case; the lens holder comprising an upper surface facing the bottom surface and a plurality of second positioning poles extending upward from the upper surface;
   a spring sheet connected between the first positioning poles and the second positioning poles;
   a coil;
   a magnet assembly, wherein one of the coil and the magnet assembly is positioned on and circles around the lens holder, and the other of the coil and the magnet assembly is positioned on the inner surface of the case;
   a guiding ring defining a guiding hole and being positioned on the inner surface of the case, one end of the lens holder receiving in the guiding hole;
   a lens barrel received in the lens holder;
   lenses received in the lens barrel; and
   an image sensor optically aligned with the lenses.

7. The lens module of claim 6, wherein the spring sheet comprises two spring portions, each of the spring portions comprises an outer portion and two inner portions connected to the outer portion, each outer portion defines a plurality of first fixing holes, each inner portion defines a second fixing hole; each of the first positioning poles is received in a respective one of the first fixing holes, each of the second positioning poles is received in a respective one of the second fixing holes.

8. The lens module of claim 7, wherein one end of the coil is connected to one of the spring portions, and another end of the coil is connected to the other spring portion.

9. The lens module of claim 6, wherein the lens holder comprises a first portion and a second portion connected at one end of the first portion, the first portion is adjacent to the upper plate, and the second portion is received in the guiding hole.

10. The lens module of claim 9, wherein the first portion comprises an outer surface, and defines a second receiving recess in the outer surface, the coil is received in the second receiving recess.

11. The lens module of claim 10, wherein a cross-sectional area of the guiding hole is slightly greater than that of the second portion of the lens holder.

12. The VCM of claim 1, wherein the spring sheet comprises two spring portions, each of the spring portions comprises an outer portion and two inner portions connected to the outer portion, each outer portion defines a plurality of first fixing holes, each inner portion defines a second fixing hole; each of the first positioning poles is received in a respective one of the first fixing holes, each of the second positioning poles is received in a respective one of the second fixing holes.

* * * * *